(12) United States Patent
MacLaurin et al.

(10) Patent No.: US 7,774,345 B2
(45) Date of Patent: Aug. 10, 2010

(54) LIGHTWEIGHT LIST COLLECTION

(75) Inventors: Matthew B. MacLaurin, Woodinville, WA (US); Stacey Ellan Harris, Redmond, WA (US); Lili Cheng, Bellevue, WA (US); Andrzej Turski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 392 days.

(21) Appl. No.: 11/823,235

(22) Filed: Jun. 27, 2007

(65) Prior Publication Data

US 2009/0006334 A1 Jan. 1, 2009

(51) Int. Cl.
G06F 17/30 (2006.01)
(52) U.S. Cl. .................. 707/736; 707/737; 707/738
(58) Field of Classification Search .................. 707/3, 707/736–738, E17.141; 715/769, 760–764
See application file for complete search history.

(56) References Cited

U.S. PATENT DOCUMENTS

| | | | |
|---|---|---|---|
| 6,321,228 B1* | 11/2001 | Crandall et al. | 707/10 |
| 6,567,810 B1 | 5/2003 | Singhal | |
| 7,031,961 B2* | 4/2006 | Pitkow et al. | 707/4 |
| 2003/0160759 A1 | 8/2003 | Martino et al. | |
| 2005/0114299 A1* | 5/2005 | Bharat | 707/2 |
| 2005/0149500 A1 | 7/2005 | Marmaros et al. | |
| 2006/0036567 A1 | 2/2006 | Tan | |
| 2006/0161535 A1 | 7/2006 | Holbrook | |
| 2006/0161856 A1* | 7/2006 | Heir | 715/769 |
| 2006/0173751 A1 | 8/2006 | Schwarze et al. | |
| 2006/0200453 A1 | 9/2006 | Santrosyan et al. | |
| 2006/0287980 A1 | 12/2006 | Liu et al. | |
| 2007/0016564 A1 | 1/2007 | Chou | |
| 2007/0033169 A1 | 2/2007 | Friedman | |
| 2007/0162424 A1* | 7/2007 | Jeh et al. | 707/2 |

OTHER PUBLICATIONS

Krishna Bharat, SearchPad: expllicit capture of search context to support Web search, 2000 Published by Elsevier Science B.V.*
Chen, et al., "A System for Organizing Intranet Search Results", as appeared in, "The Proceedings of the 2nd USENIX Symposium on Internet Technologies and Systems (USITS), Boulder, CO," Oct. 11-14, 1999.
Drori, Offer, "Using Text Elements by Context to Display Search Results in Information Retrieval Systems", pp. 1-9.
Fenstermacher, et al., "Supporting Consultants with Task-Specific Information Retrieval", pp. 1-6.
Kaugars, Karlis, "Integrated Multi Scale Text Retrieval Visualization", pp. 1-2.

* cited by examiner

*Primary Examiner*—Jean B. Fleurantin
*Assistant Examiner*—Thu-Nguyet Le

(57) ABSTRACT

Described is a collection of search-related references authored from a set of search results, in which the collection may be persisted. Search results may be obtained via a federated search of multiple data sources (e.g., local files, the Internet, a corporate network/database). Search results may be presented as individual reference items or grouped into dynamic collection query reference sets, which may be added to the collection. A collection may also embed one or more other collections. Upon opening a collection, search results may be automatically updated by re-running any dynamic collection queries. The user authors the collection by selecting items from a search results interface and dropping or pasting the item reference into a collection interface, and/or by activating an item collection affordance associated with the item. Manual or automatic layout of collection item references is provided, such as to provide a tabular layout or a two-dimensional layout.

18 Claims, 8 Drawing Sheets

LIGHTWEIGHT LIST COLLECTION

BACKGROUND

Computer users frequently deal with large amounts of information in their file systems, databases, and online search engines. These users often have a need to collect various individual data into a presentation, such as for reference or for publishing purposes.

Current search user interfaces are becoming the primary portal to a user's information. However, existing search applications do not have facilities for collecting search results. Existing mechanisms for saving search-related results (e.g., cutting-and-pasting relevant search information into a document) lose information, and/or are not sufficiently flexible.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a user interacts with a set of search results to author a collection from the search results. The collection may then be persisted, such as in the form of a named compound query document. The search results may be obtained by performing a federated search of multiple data sources (e.g., local files, the Internet, a corporate network/database). The search results may be presented as individual item reference or grouped into dynamic collection queries, whereby individual item references or dynamic collection queries (reference sets) may be added to the collection. A collection may also embed one or more other collections. Upon opening a collection, the search results therein may be automatically updated by re-running the dynamic collection query or queries.

In one aspect the user is able to select an item for inclusion as a reference in the collection, such as by dragging or cutting/copying the item reference from the search results interface and dropping or pasting the item reference into a collection interface. Alternatively, or in addition to, the user is able to select an item reference for inclusion in the collection via an item collection affordance associated with the item. Activation of an item collection affordance will automatically create and open a collection if one is not already open for editing.

In one aspect, the user is able to interact with the collection, including to edit its layout, such as to arrange a tabular layout or a two-dimensional layout of the item references, and also may request automatic layout. The user may also choose a particular visualization for a dynamic collection query, e.g., a slideshow of pictures, the properties of a document, and so forth.

In one aspect, a user authors a static collection to view search-related abstract items, including one or more single data items, one or more dynamic collection queries, and/or one or more other static collections. A search results interface comprises a unified display interface coupled to a data integration layer to obtain search results from a federated search of a plurality of sources, including a network source, a local machine source or an Internet source, or any combination of network, local machine or Internet sources. The search results interface may include an item collection affordance to add item references that can be included into the collection. A collection interface receives the user interaction input for editing a layout of item references in the collection, to automatically lay out the item references in the collection, for adding another static collection to the collection, for adjusting the visualization of a dynamic collection query, and/or for viewing the layout in a tabular arrangement or two-dimensional arrangement.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards collecting search results into a lightweight list, in which references to the search items are maintained, as opposed to the items themselves. Some of the various aspects are directed towards the integration of authoring with a search experience, a straightforward mechanism (e.g., a single-click) for collection of items in search results, and automatic layout of collected items. Other aspects are directed towards on-demand synthesis of a collection container, multi-modal authoring (e.g., as a tabular list or two-dimensional arrangement), the embedding of dynamic queries within a static collection, and the dynamic presentation of static queries within a static collection.

As will be understood, various examples are shown herein that facilitate the above concepts and aspects. However, these are only non-limiting examples for the purposes of describing the technology. As such, the present invention is not limited to any particular embodiments, aspects, concepts, protocols, formats, structures, functionalities or examples described herein. Rather, any of the embodiments, aspects, concepts, protocols, formats, structures, functionalities or examples described herein are non-limiting, and the present invention may be used various ways that provide benefits and advantages in computing in general.

Figure 1:
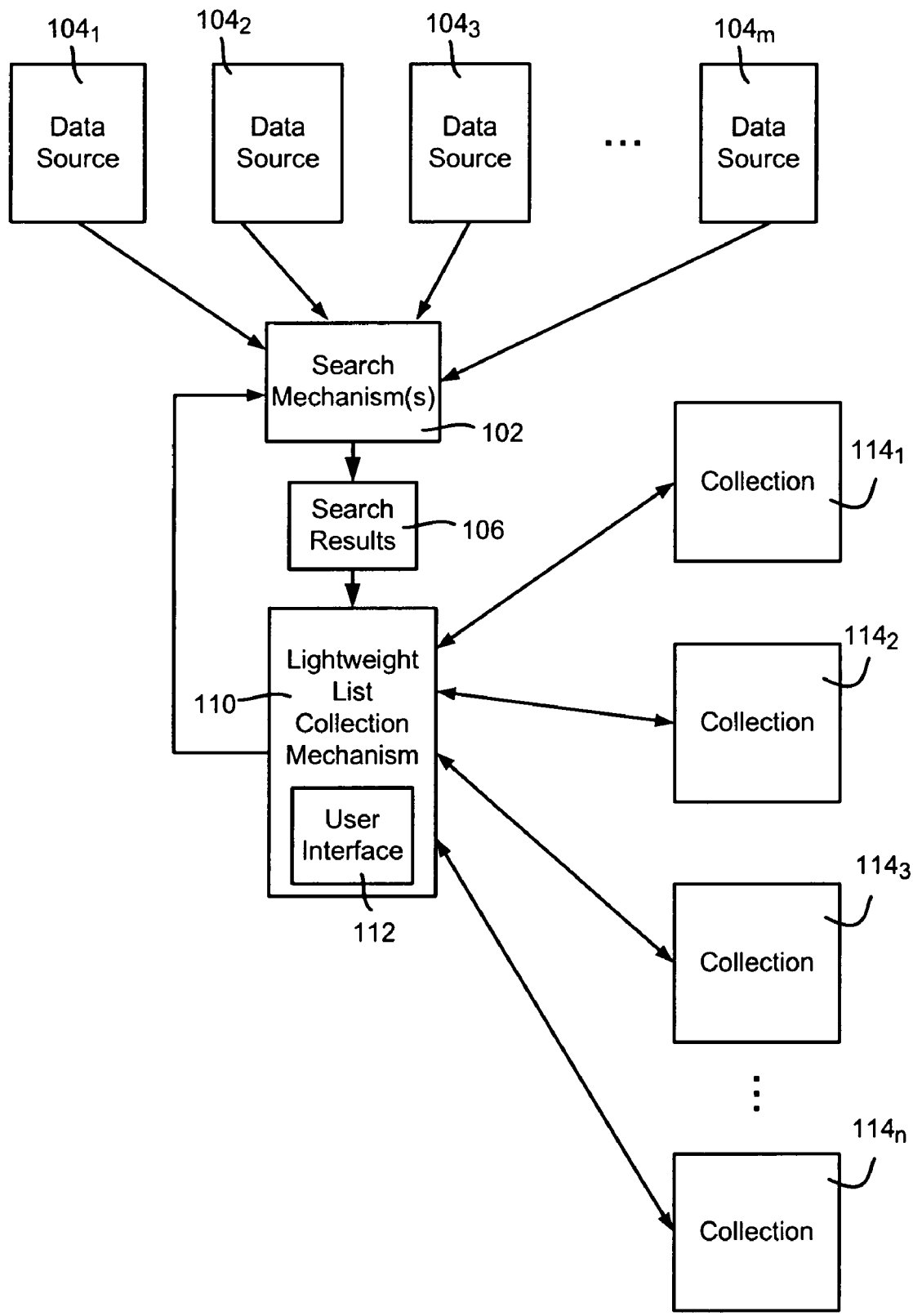
FIG. 1 is a block diagram representing the general concept of authoring a collection based on search results.

Turning to FIG. 1, there is shown a block diagram representing general concepts related to list collections. In general, one or more search mechanisms 102 perform a federated search of multiple data sources 104$_1$-104$_m$, such as a local file system, the Internet, a corporate database, and so forth. The search results 106 are then returned.

As represented in FIG. 1, a lightweight list collection mechanism 110 includes a user interface 112 (e.g., a set of application windows, dialogs, wizards or other such interactive mechanisms) by which a user can preview and build one or more collections $114_1$-$114_n$ from items returned in the search results 106 (or using search results of subsequent searches). As described below, such items include dynamic collection queries (e.g., sub-queries arranged as groups) and single data items.

In one implementation, each collection (e.g., $114_1$) comprises a compound query document that contains references to the dynamic collection queries and single data items. Moreover, a collection may contain other static collections, and even searches, e.g., the search terms used to locate items.

In general, and as described below, a user authors the collection via the user interface 112, and thereafter can access the items in a collection. Thus, for example, a user can retrieve a document via a reference to that document (e.g., a file location on a local drive or server) maintained in that collection. With respect to dynamic queries, the lightweight list collection mechanism 110 is coupled to the search mechanisms 102, and may execute a new search to obtain updated search results whenever the user accesses such a dynamic item.

Figure 2:
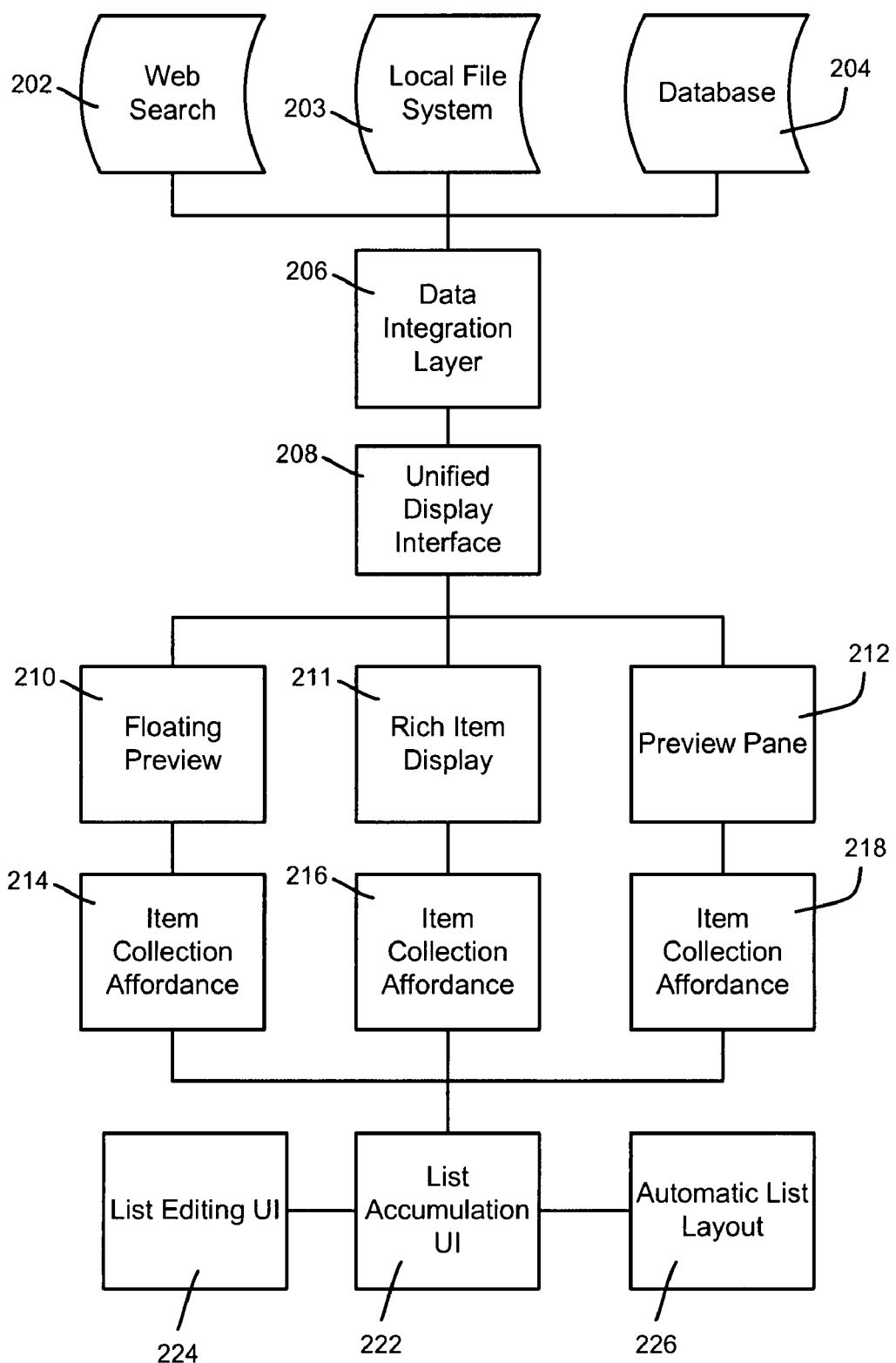
FIG. 2 is a block diagram representation of example components involved with the authoring of a collection.

FIG. 2 represents components in an example list collection implementation. As represented in FIG. 2 and as analogous to FIG. 1, a user conducts a search, drawing from a plurality of search providers, such as providers located on the Internet (e.g., web search 202), on the local machine (e.g., local file system 203) and/or on a local network (e.g., database 204). Search results are collated in the data integration layer 206 and in one implementation are presented in a consistent manner in the unified display interface 208.

For example, within the unified display interface, results can be inspected via a floating preview 210, which appears in a separate window atop a primary window when the user hovers over an item, e.g., like a tooltip, containing an image representative of an item, a set of properties for the item, and so forth. Alternatively, results may be presented in a rich item display 211, which appears within the unified display interface, or within a preview pane 212, which appears adjacent to the unified display interface 208, e.g., showing a magnified view of an item.

Each of these different views contains an item collection affordance, represented by blocks 214-216, respectively. For example, an affordance may be in the form of an accompanying icon which when clicked activates a collection process, within a right-click dropdown menu, and so forth.

When the user activates the respective item collection affordance, a collection process is initiated for that item. In one implementation, if a collection is already started, the indicated item is placed into that collection by the process; otherwise a new collection is automatically started, and the indicated item placed into the newly started collection by the collection process. This concept is represented in FIG. 2 by the list accumulation user interface (UI) 222. Note that entire searches may be placed within the collection, and these searches may retain their dynamic qualities. For example, if new items match the search, they can be displayed within the collection even if they were created after the collection.

Once a collection exists, the user may arrange and rearrange items within the collection as desired, such as by dragging items around a canvas. This concept is represented in FIG. 2 by the list editing user interface (UI) 224. The user further may add graphical and textual annotations, e.g., in association with a selected item.

As represented by the block 226, the user may also select an automatic list layout, which arranges the contents of the collection in tabular format. Automatic list layout may also arrange items in another format, such as a two dimensional layout.

Once the collection is organized in a form that the user desires, the user can persist the collection; (note that a user also can re-edit a collection at a later time). As described below, in one implementation the collection is saved as a compound query document that contains the references to the items, including dynamic items. The collection may also contain other static collections, and searches, either as references thereto or as the references/search terms themselves. Thus, the collection is lightweight because it contains references to large-sized items, rather than the contents of large items. Moreover, having a collection facilitates leaving a document in place; for example, a document on a server may get updated by various users, whereas a local copy made from that server document in one state becomes outdated if that document is changed.

Figure 3:
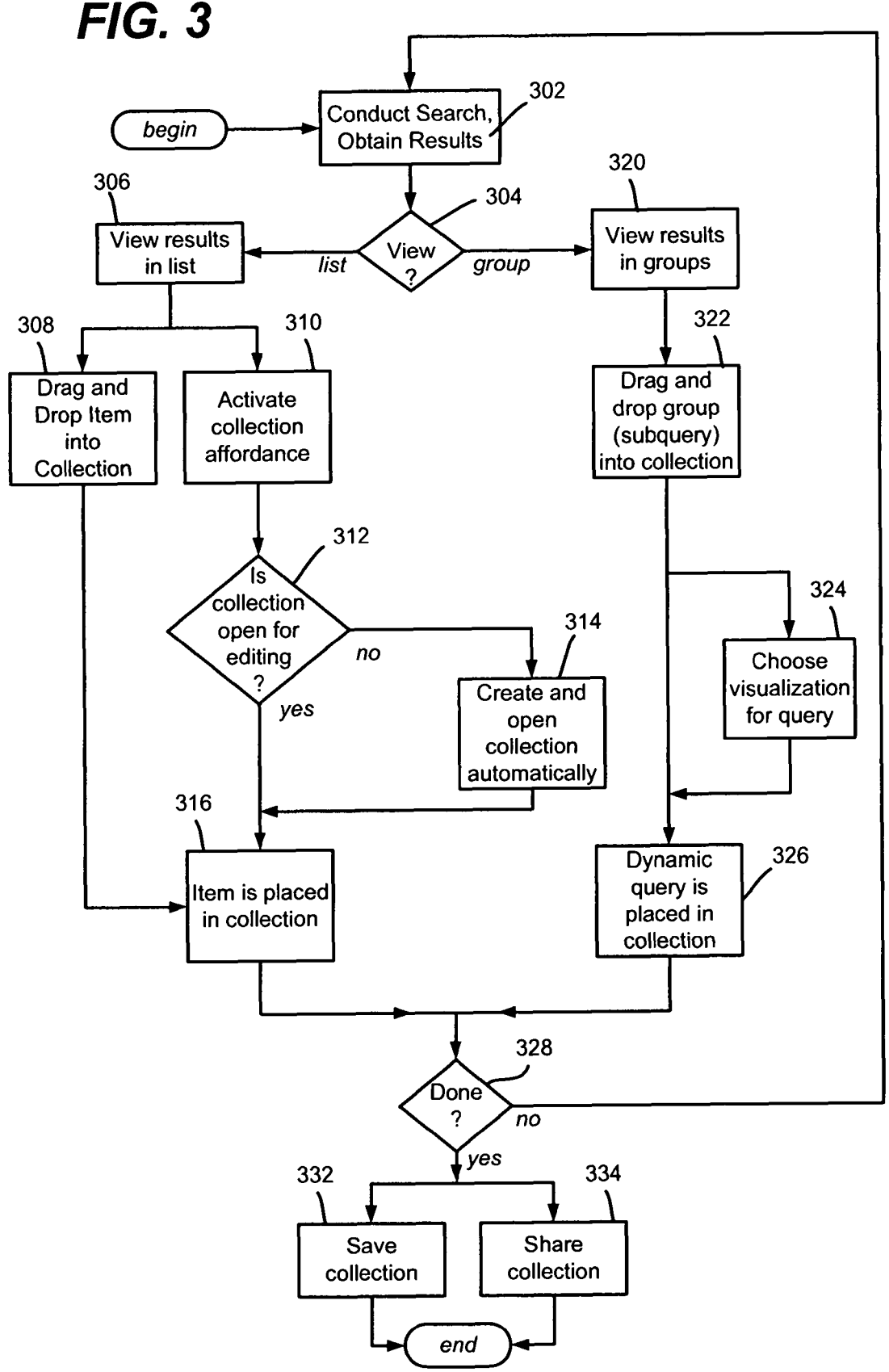
FIG. 3 is a flow diagram representing example steps taken with respect to creating and/or authoring a collection.

FIG. 3 is a flow diagram representing various aspects of collection authoring, beginning at step 302 where the user conducts a search 302. Step 304 gives the user an option of viewing the search results as a list (step 306) or in groups (step 320). Examples of grouping are set forth below. Note that if a list view is selected, a user may interact with any partial results as they are returned, however in general grouping is performed only when a search is complete.

Figure 6:
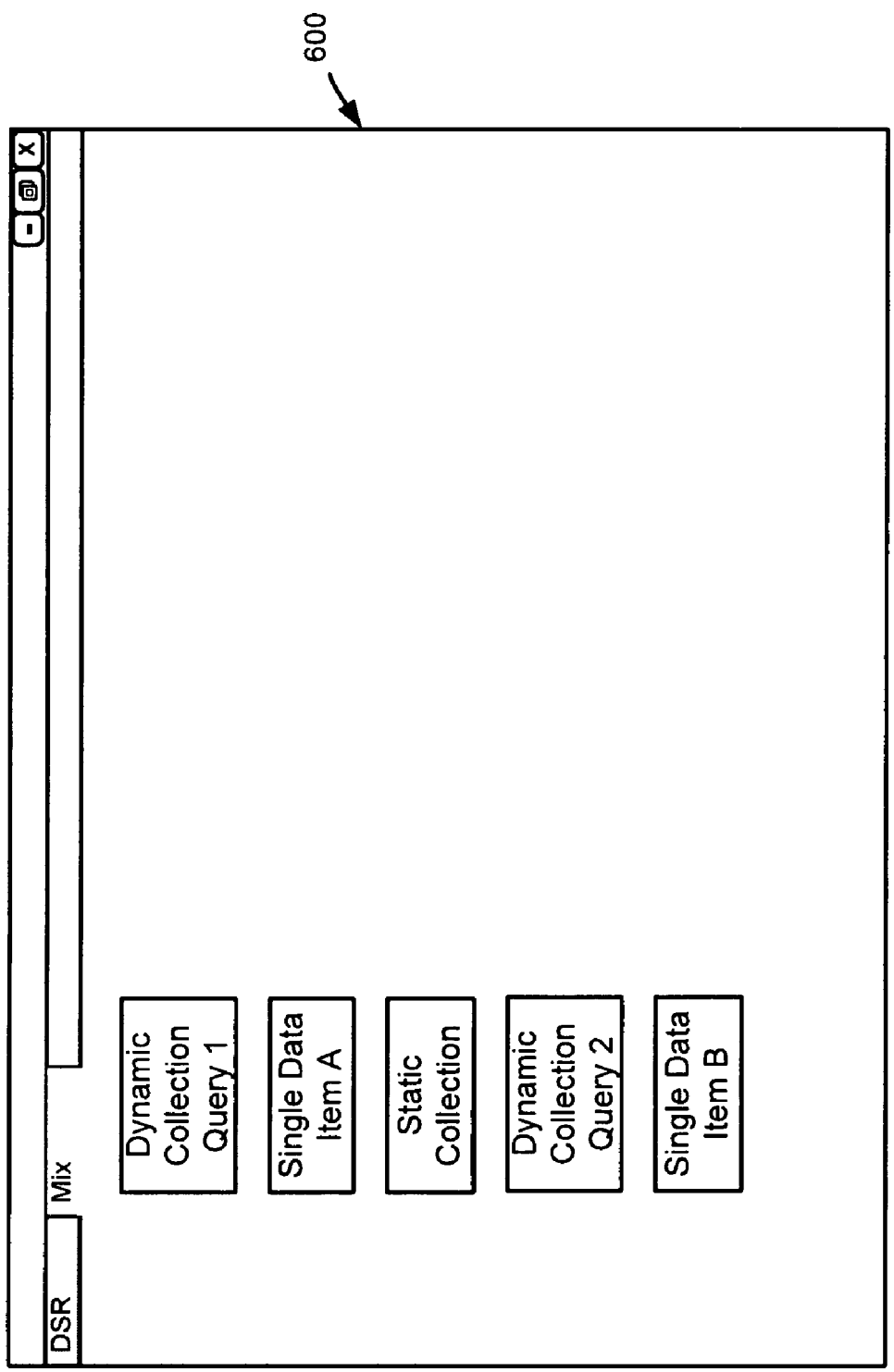
FIG. 6 is a representation of a user interface mechanism by which a collection may be authored.

If the user selects the list view, the user can select an item and add it to the collection by a selection mechanism (e.g., dragging and dropping an item, step 308) or via its affordance (step 310), e.g., into an open collection at step 316. Note that in this example if the user activates an item's affordance at step 310, and no collection is currently open (step 312), a collection is automatically created and opened at step 314, (an on-demand synthesis of a collection container) before the item is added to the collection at step 316. FIG. 6 shows an example of a canvas 600, corresponding to a "mix" window, for placing and then rearranging items (and groups, described below) during the collection authoring process.

Step 328 represents looping back to add more items to the collection until the user is done; note that a new search may be conducted, or the user may continue to interact with the current search results.

Figure 4:
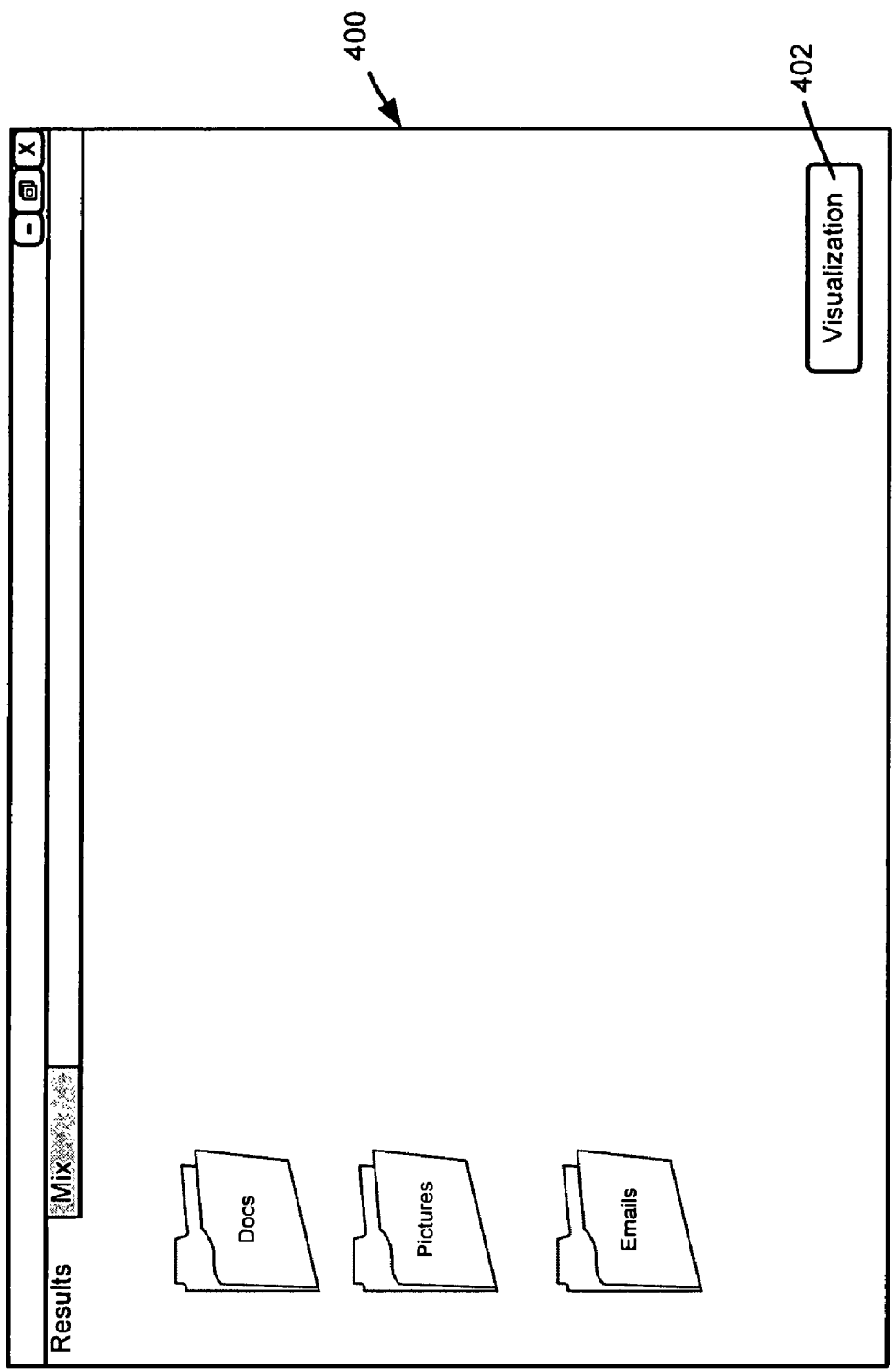
FIG. 4 is a representation of a user interface mechanism by which grouped search result items may be presented to a user for authoring a collection.
Figure 5:
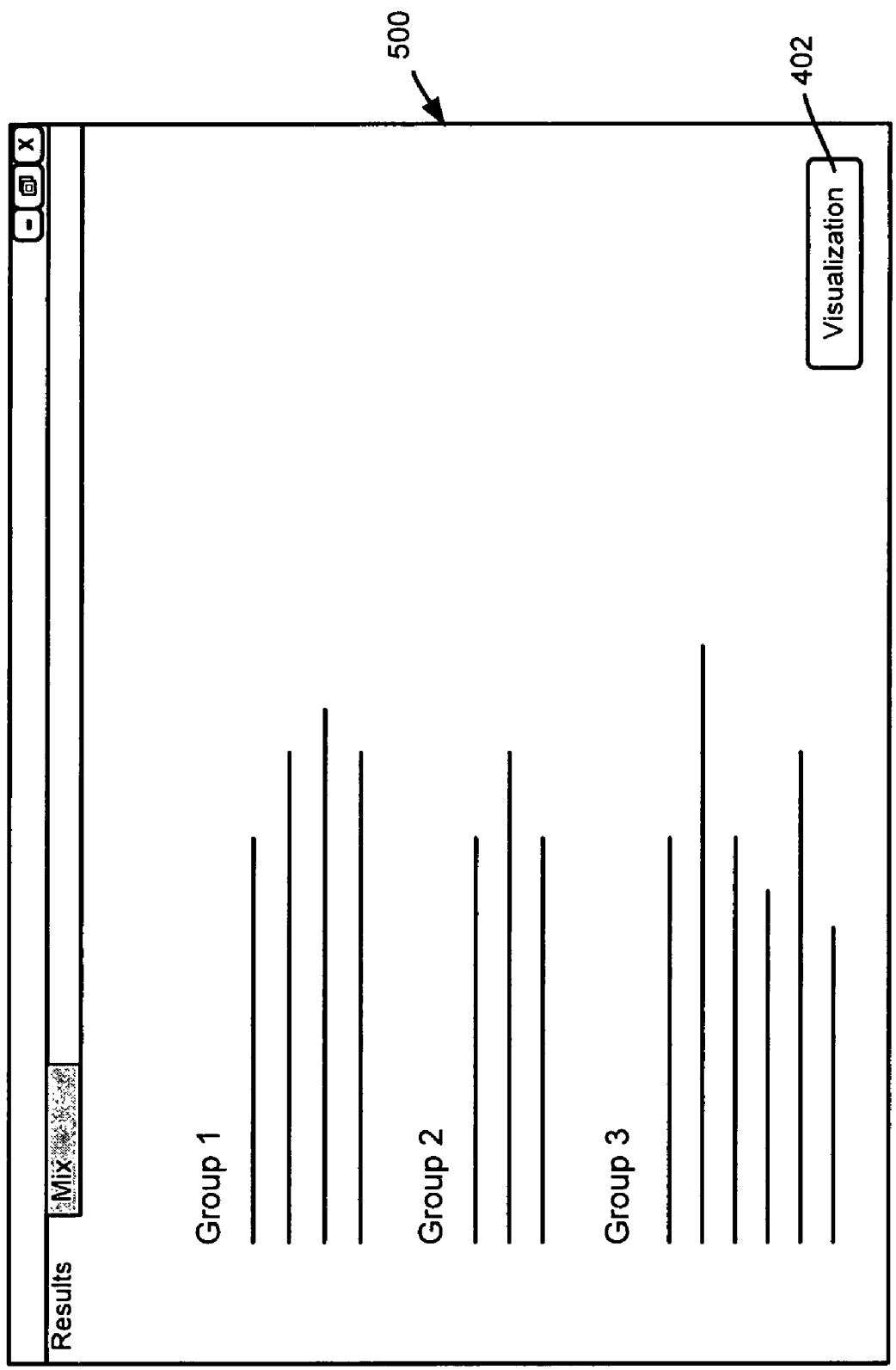
FIG. 5 is a representation of a user interface mechanism by which grouped search result items may be alternatively presented to a user for authoring a collection.

If at step 304 the user chooses to view the results as dynamic collection queries, e.g., groups, step 320 is performed. Examples of grouping include grouping by item type (such as differentiating documents, pictures, emails), grouping by document author or owner, grouping by date and so forth, essentially grouping by any property set/metadata accompanying an item. FIGS. 4 and 5 show different ways groups may be represented in a results window, e.g., as a stack representation 400 or as an arrangement 500 of groups with their respective single items set forth below.

As represented by step 322, groups can be selected and placed (e.g., dragged/copied and dropped/pasted into a list collection. FIG. 6 shows an example of a canvas 600, corresponding to a "mix" window, for placing single static items and groups during the authoring process and then rearranging them (manually or automatically) as desired.

A user can also choose a visualization for a group, as represented via step 324, e.g., using a visualization selection mechanism 402 in FIGS. 4 and 5. For example, a user may choose to put a group of pictures into a slideshow visualization, show detailed text of a debug report, show properties of documents, and so forth. Whether a user chooses a visualization or uses the default visualization, the group (dynamic query) is placed into the collection at step 326.

Once the collection is authored, the collection is saved, as represented at step 322, e.g., in a named compound query document containing the items. The collection may also be shared, as represented via step 334.

Figure 7:
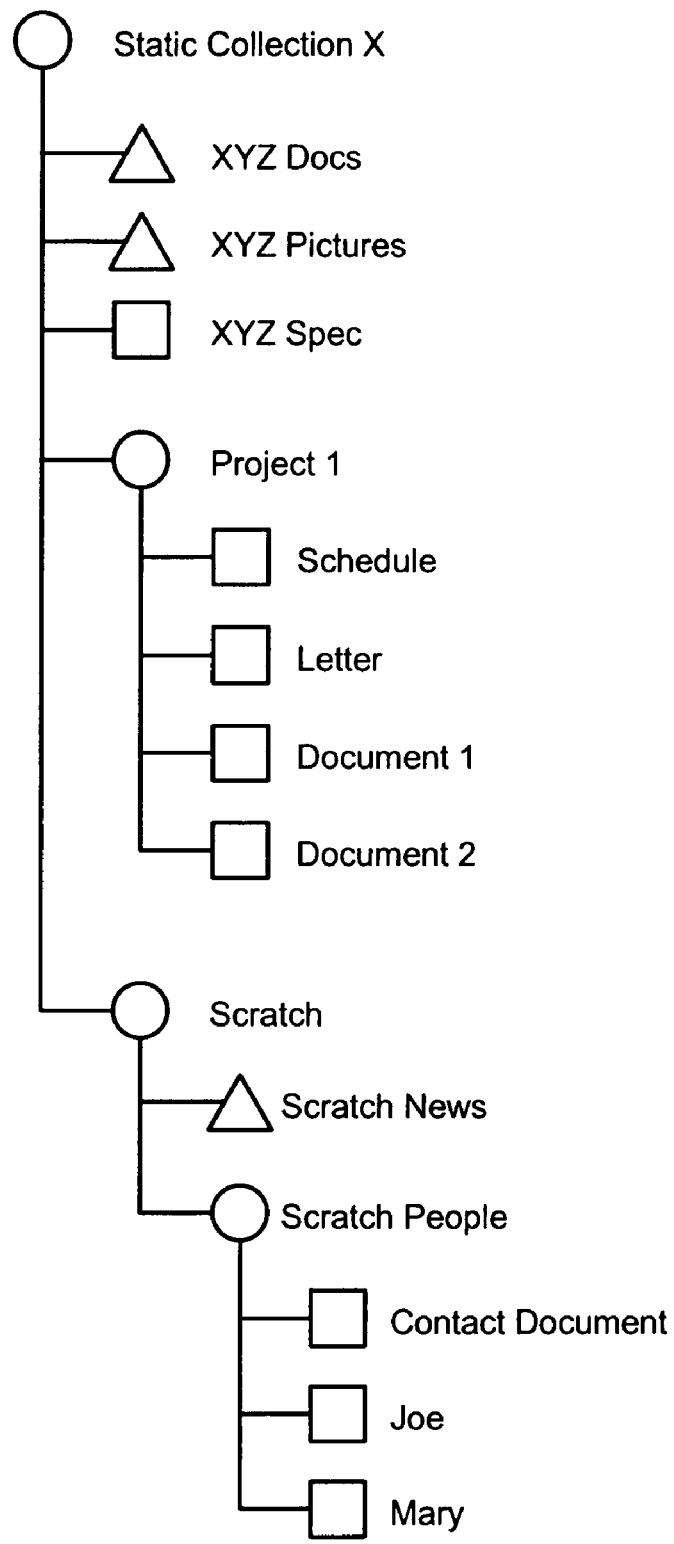
FIG. 7 is a representation of how a compound query document may be logically arranged to persist a collection.

An example of a compound query document is represented in FIG. 7, and may be (logically) hierarchically arranged. In FIG. 7, static collections are represented by a circle, dynamic collection queries by a triangle, and single data items by a square. Note that the top abstract item is a static collection, and corresponds to the Mix canvas when saved (e.g., named "Static Collection X". As can be seen in FIG. 7, single static items may be embedded into a static collection, dynamic queries may be embedded into a static collection, and/or other static collections may be embedded into a static collection (e.g., "Project 1" and Scratch" which contain single items and a combination of single items and a dynamic collection query, respectively). Any practical number of abstract items may be maintained in a collection, and arranged and nested as desired by the collection author.

Further, a search and/or its results may be saved as an abstract item within a collection. However, with respect to sharing a collection, note that as can be readily appreciated, while in general a user may want to share a collection, the user may not want to share every item found within a collection. For example, a collection may dynamically search a user's email messages corresponding to an "email" group or the like, whereby any new emails, including sensitive or personal ones, would be accessible. To prevent this, an author may choose to make search results static instead of dynamic. When the collection is re-opened, a new search will not be performed on any search marked static, essentially pinning the result set. Note that the search query still exists and can be reused, but opening the collection (e.g., via the Mix user interface will not re-run the query.

Exemplary Operating Environment

Figure 8:
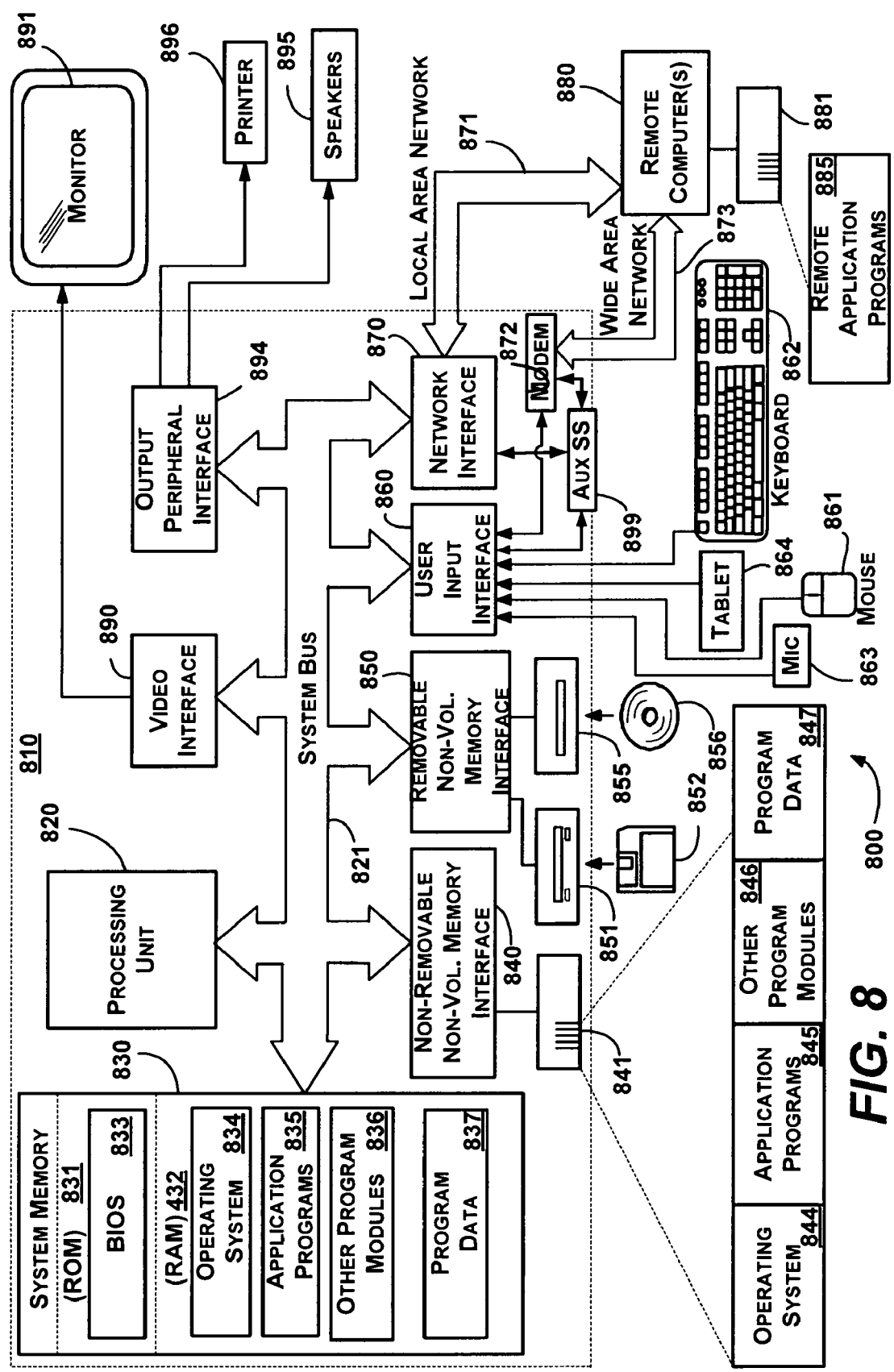
FIG. 8 shows an illustrative example of a general-purpose network computing environment into which various aspects of the present invention may be incorporated.

FIG. 8 illustrates an example of a suitable computing system environment 800 on which the examples represented in FIGS. 1-7 may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 8, an exemplary system for implementing various aspects of the invention may include a general purpose computing device in the form of a computer 810. Components of the computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 810 typically includes a variety of computer-readable media. Computer-readable media can be any available media that can be accessed by the computer 810 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 810. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836 and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media, described above and illustrated in FIG. 8, provide storage of computer-readable instructions, data structures, program modules and other data for the computer 810. In FIG. 8, for example, hard disk drive 841 is illustrated as storing operating system 844, application programs 845, other program modules 846 and program data 847. Note that these components can either be the same as or different from operating system 834, application programs 835, other program modules 836, and program data 837. Operating system 844, application programs 845, other program modules 846, and program data 847 are given different numbers herein to illustrate that, at a minimum, they are different copies. A user may enter commands and information into the computer 810 through input devices such as a tablet, or electronic digitizer, 864, a microphone 863, a keyboard 862 and pointing device 861, commonly referred to as mouse, trackball or touch pad. Other input devices not shown in FIG. 8 may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. The monitor 891 may also be integrated with a touch-screen panel or the like. Note that the monitor and/or touch screen panel can be physically coupled to a housing in which the computing device 810 is incorporated, such as in a tablet-type personal computer. In addition, computers such as the computing device 810 may also include other peripheral output devices such as speakers 895 and printer 896, which may be connected through an output peripheral interface 894 or the like.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include one or more local area networks (LAN) 871 and one or more wide area networks (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860 or other appropriate mechanism. A wireless networking component 874 such as comprising an interface and antenna may be coupled through a suitable device such as an access point or peer computer to a WAN or LAN. In a networked environment, program modules depicted relative to the computer 810, or portions thereof, may be stored in the remote memory storage device. By way of example, and not limitation, FIG. 8 illustrates remote application programs 885 as residing on memory device 881. It may be appreciated that the network connections shown are exemplary and other means of establishing a communications link between the computers may be used.

An auxiliary subsystem 899 (e.g., for auxiliary display of content) may be connected via the user interface 860 to allow data such as program content, system status and event notifications to be provided to the user, even if the main portions of the computer system are in a low power state. The auxiliary subsystem 899 may be connected to the modem 872 and/or network interface 870 to allow communication between these systems while the main processing unit 820 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. At least one computer-readable storage medium having computer-executable instructions that when executed by a computer perform steps, the steps comprising:

displaying search results to a user, the search results having been obtained by, in response to inputting a first query by the user, searching both local storage of the computer for local data items that match the first query and searching one or more computers on the network for remote data items that match the first query, wherein some of the data items are documents and files, and wherein the search results comprise those remote and local data items that match the first query;

displaying a user interface with a user interface element whose activation by the user with reference to a data item in the displayed search results causes a determination to be made of whether a collection is open for editing and if not causes creation of a new collection which becomes the collection open for editing, the activation also causing the data item to be added to the collection open for editing, wherein the user uses the user interface to interact with the search results to author the collection open for editing, the collection, in accordance with the interaction is then comprised of references to various of the data items in the search results that were interactively selected by the user via the user interface element, wherein the user interface also allows the user to add to the collection a second query that becomes a member of the collection and allows the user to select from among collections previously created with the user interface an existing other collection to be added to the collection open for editing wherein any collection is permitted to contain another collection as a member thereof; and persisting the collection on the computer such that when the collection is selected by the user the computer displays indicia of the data items referred to by the references in the collection, wherein when the collection is selected by the user the second query is automatically executed to search both the local storage and the one or more remote computers and any local or remote data items that match the second query are displayed with the data items previously selected by the user for inclusion in the collection, and where the other collection added to the collection is also displayed by running any queries therein and by displaying any collections therein.

2. The computer-readable storage medium of claim 1 wherein the search of the local storage and the one or more computers on the network is performed by a federated search facility that takes arbitrary user queries and searches plural different types of data sources for data items that match the queries and which presents data items that match a query as a single unified search result set.

3. The computer-readable storage medium of claim 1 wherein the user interface element comprises a collection affordance displayed in response to selecting the data item.

4. The computer-readable storage medium of claim 1 wherein displaying the search results comprises grouping results, and wherein the user interacts with the search results to author the collection by selecting the second query for inclusion as a reference set in the collection.

5. The computer-readable storage medium of claim 4 having further computer-executable instructions for performing steps comprising opening the collection after it is persisted, and automatically updating search results corresponding to the collection by re-running the second query against at least two different types of data sources.

6. The computer-readable storage medium of claim 5 having further computer-executable instructions for performing steps comprising providing a collection interface by which the user interacts with the collection, including by dropping or pasting the selected second query reference into the collection interface.

7. The computer-readable storage medium of claim 5 having further computer-executable instructions for performing steps comprising providing a collection interface by which the user interacts with the collection, including by choosing a visualization for the second query.

8. The computer-readable storage medium of claim 1 having further computer-executable instructions for performing steps comprising providing a collection interface by which the user interacts with the collection, including automatically laying out item references in the collection.

9. The computer-readable storage medium of claim 1 having further computer-executable instructions for performing steps comprising providing a collection interface by which the user interacts with the collection, including to edit the layout of item references in the collection.

10. The computer-readable storage medium of claim 1 having further computer-executable instructions for performing steps comprising providing a collection interface by which the user interacts with the collection, including to view item references in the collection in a tabular arrangement or a two-dimensional arrangement.

11. At least one computer-readable storage medium according to claim 1 wherein the searching of the local storage and the searching of the remote one or more computers are performed in parallel.

12. At least one computer-readable storage medium according to claim 1, the user interface further comprising a selectable setting for each collection that when selected by the user renders the collection static such that references for the data items currently matching the query are added to the collection and when the collection is subsequently displayed the query is not executed but rather the data items are displayed according to the references.

13. A method performed by a computer, the method comprising:
passing a first user-inputted query to a unified search process that collects references to local search results comprised of data items stored on the computer that match the query and that collects references to remote search results comprised of data items accessible via a network and which match the query, wherein some of the data items are documents and files;
displaying a collection formed by a user interacting with a view of the data items in the search results, the collection including one or more single data item references comprised of various of the local and remote data items selected by the user from among the data items in the search results, one or more dynamic collection query reference sets comprising a query inputted by the user and stored as part of the collection, the view including a user interface element whose activation by the user with reference to a data item in a displayed list of the search results causes a determination to be made of whether a collection is open for editing and if not causes creation of the collection which becomes the collection open for editing, the activation also causing the data item to be added to the collection open for editing; and
displaying a user interface including:
a search results interface with which the user interacts and is able to select single data items and dynamic collection queries for inclusion of corresponding references in the collection, the dynamic collection queries comprising queries other than the first user-inputted query, and
a collection interface with which the user interacts to view items in the collection, wherein when the user interacts with the user interface and selects the collection the data items to be viewed comprise the local and remote data items previously added to the collection by the user and dynamic data items found by performing the query corresponding to the dynamic collection query reference.

14. The method of claim 13 wherein the search results interface comprises a unified display interface coupled to a data integration layer to obtain search results from a federated search of a plurality of sources, including a network source, a local machine source or an Internet source, or any combination of network, local machine or Internet sources.

15. The method of claim 13 wherein the user interface includes an item collection affordance for each of at least some of the data items that can be included into the static collection, and wherein activation of the item collection affordance automatically adds its corresponding data item reference to the collection, including creating and opening the collection if not already open.

16. A method performed by a computer, the method comprising:
receiving a first query inputted by a user;
passing the first query to a unified search process that collects references to local search results comprised of data items stored on the computer that match the first query and that collects references to remote search results comprised of data items accessible via a network and which match the first query, wherein some of the data items are documents and files;

displaying the local search results and remote search results as a single search result set in a first user interface, where user input entered via a user interface element of the first user interface and directed to one of the local or remote data items causes a determination to be made of whether a collection is open for editing and if not causes creation of a new collection which becomes the collection open for editing, the activation also causing the data item to be added to the collection open for editing, and where user input directed to the first user interface selects various of the local and remote data items and adds them as members of the collection by adding references to the selected data items to the collection, the collection also including a dynamic query as a member comprised of a user-inputted second query, wherein the second query is not the first query;

persistently storing the collection; displaying indicia of a plurality of collections including the collection, and in response to the user selecting a displayed indicator of the collection, displaying in a second user interface graphical indicia of the members of the collection, the members including the local and remote data items having references in the collection, the members also including dynamic data items dynamically determined, upon selection of the collection by performing a search for data items that match the second query; and allowing the user to select any of the data items, including the local data items, the remote data items, and the dynamic data items, and in response to the selection either accessing the selecting data item or displaying information about the selected data item.

17. The method of claim 16 wherein the displaying the references to the local search results further comprises displaying an item collection affordance with each item reference and allowing the user to activate or drag the item collection affordances to cause corresponding data items to be added to the collection.

18. The method of claim 16 further comprising receiving user input directed to automatically laying out the item references in the collection, receiving user input for adding another collection to the collection, receiving input that selects a visualization of the data items of the second query, or receiving input that selects either a tabular arrangement or two-dimensional arrangement for the visualization.

* * * * *